UNITED STATES PATENT OFFICE.

HUGH A. GALT, OF AKRON, OHIO, ASSIGNOR TO COLUMBIA CHEMICAL COMPANY, OF BARBERTON, OHIO, A CORPORATION OF PENNSYLVANIA.

PROCESS FOR MANUFACTURING MAGNESIUM SALTS.

1,262,938.  Specification of Letters Patent.  Patented Apr. 16, 1918.

No Drawing.    Application filed January 22, 1915.   Serial No. 3,822.

*To all whom it may concern:*

Be it known that I, HUGH A. GALT, a resident of Akron, in the county of Summit and State of Ohio, have invented a new and useful Improvement in Processes for Manufacturing Magnesium Salts, of which the following is a specification.

This invention relates to a process of manufacturing magnesium salts, and particularly a process which can be carried out in conjunction with the manufacture of caustic soda so that the magnesium salts are produced as a byproduct in the caustic soda process.

In the manufacture of caustic soda on a commercial scale a common method treats soda ash or sodium carbonate with lime (CaO), the reaction being carried out in large vats and in the presence of a comparatively large quantity of water so that the mass action converts the sodium carbonate into sodium hydrate and precipitates calcium carbonate, according to the following reaction:—

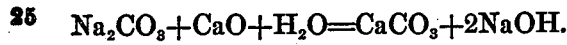

$$Na_2CO_3 + CaO + H_2O = CaCO_3 + 2NaOH.$$

The caustic soda remains in solution and the precipitated calcium carbonate is separated by filtration or decantation and is washed with water to remove the caustic soda. It is practically impossible to remove all of the caustic soda from the calcium carbonate and the latter, with the small amount of soda therein, constitutes substantially a waste product known as "lime mud."

According to my improved method the causticizing process is carried out by substituting for the usual lime, composed almost wholly of calcium oxid, an oxid made from dolomite rock or magnesite, which are respectively a compound carbonate of calcium and magnesium, and a carbonate of magnesium alone, or any other rock or material containing magnesium alone or in combination with calcium. This double oxid of calcium and magnesium is used in the same manner as the ordinary lime by heating it in large vats with the soda ash or sodium carbonate in the presence of a large quantity of water, the mass action of which produces the above reaction between the calcium and soda ash or sodium carbonate and a similar reaction with the magnesium oxid, according to the following equation:—

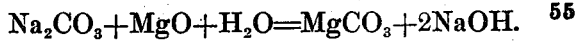

$$Na_2CO_3 + MgO + H_2O = MgCO_3 + 2NaOH.$$

The precipitate is therefore either wholly magnesium carbonate or a combination of magnesium and calcium carbonates. The filtrate, as before, is caustic soda, which is separated from the precipitate in the usual manner by filtration or decantation and washing of the precipitate, being then concentrated according to the well known practice.

The precipitate is made into a slurry, that is, a fluid mud (if not already in this condition), and is subjected to treatment with carbonic acid gas, preferably under pressure in sealed tanks. By carrying out this treatment for the proper period the magnesium carbonate goes into solution as bicarbonate of magnesia, to wit, $MgH_2(CO_3)_2$, but the calcium carbonate remains unaffected and insoluble. The filtrate, containing the bicarbonate of magnesia, is then separated from the insoluble carbonate of lime in any suitable manner, as by decantation or filtration and is heated, preferably to boiling temperature, either in the precipitating tank or in a separate tank. This drives off the excess carbonic acid gas and decomposes the bicarbonate of magnesia into what is technically called "magnesium carbonate," or "magnesia alba," that is, a hydrated magnesium carbonate having the symbol $MgCO_3MgO_2H_2$. This substance precipitates, is separated from the filtrate in the usual manner and is collected and dried.

The calcium carbonate remaining after the carbonic acid gas treatment may be dried and used as Whiting, filler, or for any other suitable purpose.

The precipitated magnesium carbonate or magnesia alba, separated as above, may be used in various ways, either in the form in which it is produced, or after further treatment. If it is intended for magnesium oxid it is heated to the proper temperature in a suitable kiln to drive off the water and carbonic acid gas, leaving a high grade substantially pure MgO.

The magnesium carbonate may also be used for the production of magnesium chlorid. In this case it is subjected to a double decomposition with calcium chlorid solution, such as is obtained as a byproduct in the well known ammonia soda process. The operation is carried out in large tanks in which the proper quantities of magnesium carbonate and calcium chlorid solution are digested. Preferably, said tanks are heated, as by steam, in order to promote the reaction, which consists in an interchange of the bases, or in other words a simultaneous conversion of magnesium carbonate and hydrate into chlorid, and of calcium chlorid into carbonate and hydrate. The equations are as follows:—

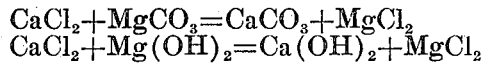

$$CaCl_2+MgCO_3=CaCO_3+MgCl_2$$
$$CaCl_2+Mg(OH)_2=Ca(OH)_2+MgCl_2$$

The reaction is most efficient and complete when the materials are under pressure and, therefore, the treating vats are preferably sealed and the steam for heating, digesting and agitating is introduced under pressure, although this steam may be generated from the water in the solution itself by the application of external heat. The calcium carbonate and hydrate are both insoluble, especially in the presence of the magnesium chlorid which saturates the solution and prevents it from taking up any of the calcium hydrate, which ordinarily is sparingly soluble. As a consequence, the calcium compounds precipitate and the mass is filtered or decanted to separate the liquor from the solids.

The magnesium chlorid solution may be evaporated to dryness, but preferably to the crystallizing point, and the salt separates in small finely divided crystals which are readily soluble, in fact are in a much more available condition than the fused magnesium chlorid, the common form now on the market.

The precipitated calcium carbonate and hydrate is washed and dried and may either be used by itself or added to the carbonate produced earlier in the process for use as filler, Whiting, or in any other way.

The method described is simple and materially decreases the cost of the caustic soda, due to the fact that with only a little additional labor the valuable magnesium salts are produced as a byproduct. The proportion of lime waste is also very materially reduced, due to the substitution of a magnesium oxid for a part of the lime formerly used, the magnesium being wholly recovered as a byproduct. Consequently the overhead charge for dumping ground for this lime waste is diminished. By carrying out the method with the proper precautions substantially pure magnesium salts are produced.

What I claim is:—

1. A process which comprises treating the sludge resulting from the causticizing of sodium carbonate with a compound containing calcium and magnesium oxids or hydroxids with water and carbon dioxid under pressure to dissolve the magnesium carbonate, separating the solution containing the magnesium compound, and heating it to precipitate the magnesium.

2. A process which comprises treating the sludge resulting from the causticizing of sodium carbonate with a hydrated calcined dolomite with water and carbon dioxid under pressure to dissolve the magnesium carbonate, separating the solution containing the magnesium compound, and heating it to precipitate the magnesium and subsequently separating out the precipitated magnesium.

3. A process which comprises treating the sludge resulting from causticizing sodium carbonate with a compound containing calcium and magnesium oxids or hydroxids with water and carbon dioxid under pressure to dissolve the magnesium carbonate, separating the solution containing the magnesium compound and heating it until the magnesium is precipitated, collecting the precipitate, and digesting it with a calcium chlorid solution to convert it into magnesium chlorid.

4. A process which comprises treating a mixture of precipitated calcium and magnesium carbonates with water and carbon dioxid under pressure to dissolve the magnesium carbonate, separating the solution containing the magnesium compound and heating it until the magnesium is precipitated, collecting the precipitate, and digesting it with a calcium chlorid solution to convert it into magnesium chlorid.

5. A process of producing caustic soda and magnesium salts, which comprises causticizing sodium carbonate with a material containing calcium and magnesium oxids to thereby form caustic soda and magnesium and calcium carbonates, treating the resultant precipitate in the presence of water with carbonic acid gas under pressure to dissolve the magnesium carbonate, separating out the calcium carbonate, and precipitating the magnesium from the remaining solution.

6. The process of producing caustic soda and utilizing the additional materials resulting from the process, which comprises causticizing sodium carbonate with a hydrated calcined dolomite to thereby form caustic soda and magnesium and calcium carbonates, separating out the caustic soda and treating the remaining precipitate in the presence of water with carbonic acid gas under pressure to dissolve the magnesium carbonate, separating out the insoluble calcium carbonate, and heating the remaining solution to precipitate the magnesium.

7. A combined process for producing caustic soda and magnesium chlorid, which comprises causticizing sodium carbonate with calcined hydrated dolomite to produce caustic soda and a magnesium calcium carbonate, separating out the precipitate and treating it with carbonic acid gas to dissolve the magnesium carbonate, separating the solution containing the magnesium compound and heating it until the magnesium is precipitated, and digesting the precipitate with a calcium chlorid solution to produce magnesium chlorid, calcium carbonate and calcium hydrate.

8. A process which comprises treating the sludge resulting from causticizing sodium carbonate with a compound containing calcium and magnesium oxids or hydroxids with water and carbon dioxid under pressure to dissolve the magnesium carbonate, separating the solution containing the magnesium compound and heating it until the magnesium is precipitated, collecting the precipitate, and heating it under pressure with the calcium chlorid liquor resulting from the manufacture of alkali by the ammonia soda process to produce magnesium chlorid.

9. A process which comprises treating the sludge resulting from causticizing sodium carbonate with a hydrated calcined dolomite with water and carbon dioxid under pressure to dissolve the magnesium carbonate, separating the solution containing the magnesium compound and heating it until the magnesium is precipitated, collecting the precipitate, and heating it under pressure with the calcium chlorid liquor resulting from the manufacture of alkali by the ammonia soda process to thereby produce magnesium chlorid.

10. A process which comprises treating a mixture of precipitated calcium and magnesium carbonates with water and carbon dioxid under pressure to dissolve the magnesium carbonate, separating the solution containing the magnesium and heating it until the magnesium is precipitated, collecting the precipitate, and digesting it with the calcium chlorid liquor resulting from the manufacture of an alkali by the ammonia soda process to thereby produce magnesium chlorid and calcium carbonate.

In testimony whereof, I have hereunto set my hand.

HUGH A. GALT.

Witnesses
R. H. COPELAND,
D. N. CLAUSE.